United States Patent
Kawai et al.

(10) Patent No.: US 7,116,328 B2
(45) Date of Patent: Oct. 3, 2006

(54) INFORMATION-PROCESSING APPARATUS, IMAGE DISPLAY CONTROL METHOD AND IMAGE DISPLAY CONTROL PROGRAM

(75) Inventors: Eiji Kawai, Kanagawa (JP); Naoto Ishida, Saitama (JP); Masaaki Miyazawa, Kanagawa (JP); Masafumi Hatanaka, Tokyo (JP); Makoto Okazaki, Tokyo (JP); Nao Tazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 10/674,425

(22) Filed: Oct. 1, 2003

(65) Prior Publication Data
US 2004/0163527 A1 Aug. 26, 2004

(30) Foreign Application Priority Data
Oct. 3, 2002 (JP) ............................ P2002-291425

(51) Int. Cl.
*G06T 13/00* (2006.01)
(52) U.S. Cl. ........................ 345/473; 345/474; 84/2; 84/603; 715/500.1

(58) Field of Classification Search ............ 345/473, 345/474, 475; 84/603, 2; 715/500.1
See application file for complete search history.

(56) References Cited

U.S. PATENT DOCUMENTS

| 5,048,390 | A | 9/1991 | Adachi et al. |
| 5,508,470 | A | 4/1996 | Tajima et al. |
| 5,533,903 | A | 7/1996 | Kennedy |
| 6,225,545 | B1 | 5/2001 | Suzuki et al. |
| 6,898,759 | B1 * | 5/2005 | Terada et al. ............ 715/500.1 |

FOREIGN PATENT DOCUMENTS
EP   1 031 363 A2   8/2000

* cited by examiner

*Primary Examiner*—Kimbinh T. Nguyen
(74) *Attorney, Agent, or Firm*—Oblon, Spivak, McClelland, Maier & Neustadt, P.C.

(57) ABSTRACT

The present invention is intended to provide a information processing apparatus that includes information accumulating means for accumulating image motion information, display means for displaying images, and control means for detecting, from music information, a division at which tune change occurs and/or a climax section of music, selecting said image motion information on the basis of a result of the detection, and displaying on said display means a moving image in accordance with the reproduction of said music information by use of the selected image motion information in accordance with the reproduction of said music information.

9 Claims, 13 Drawing Sheets

F I G. 1
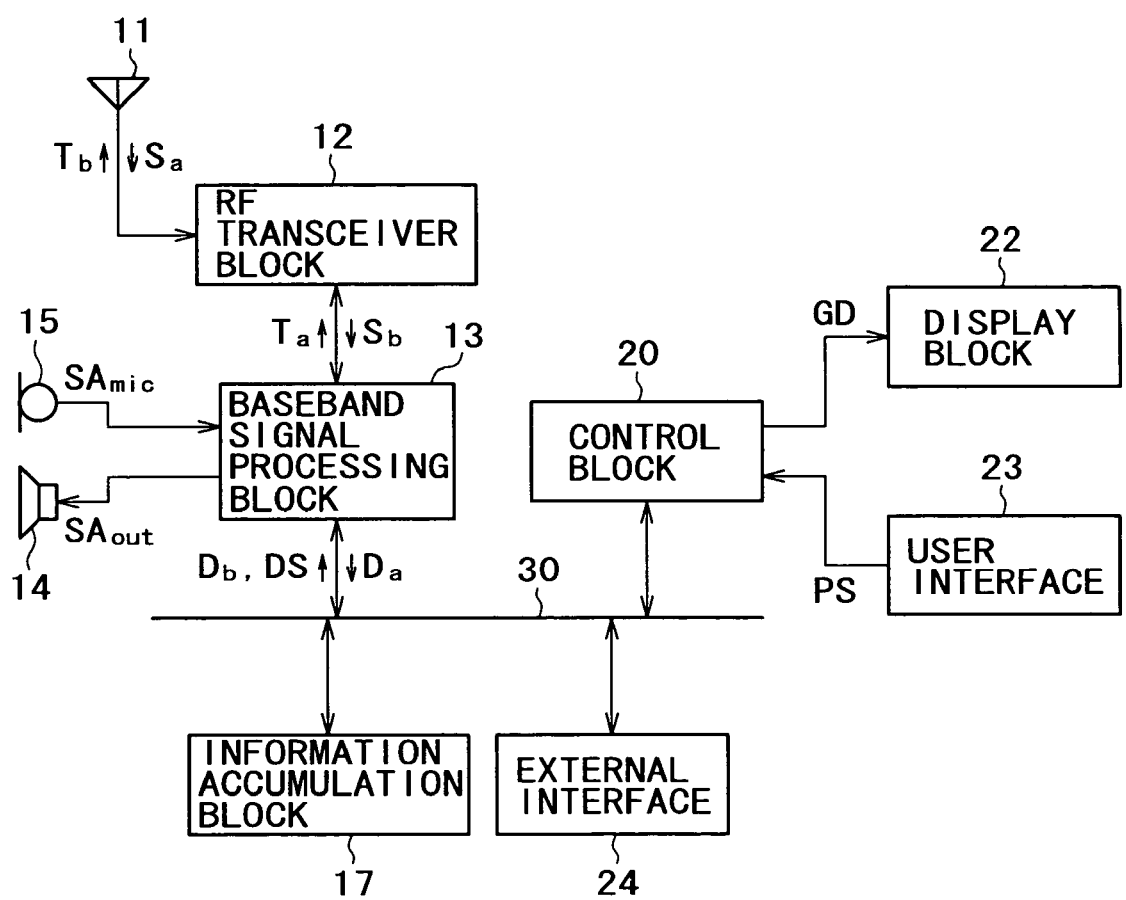

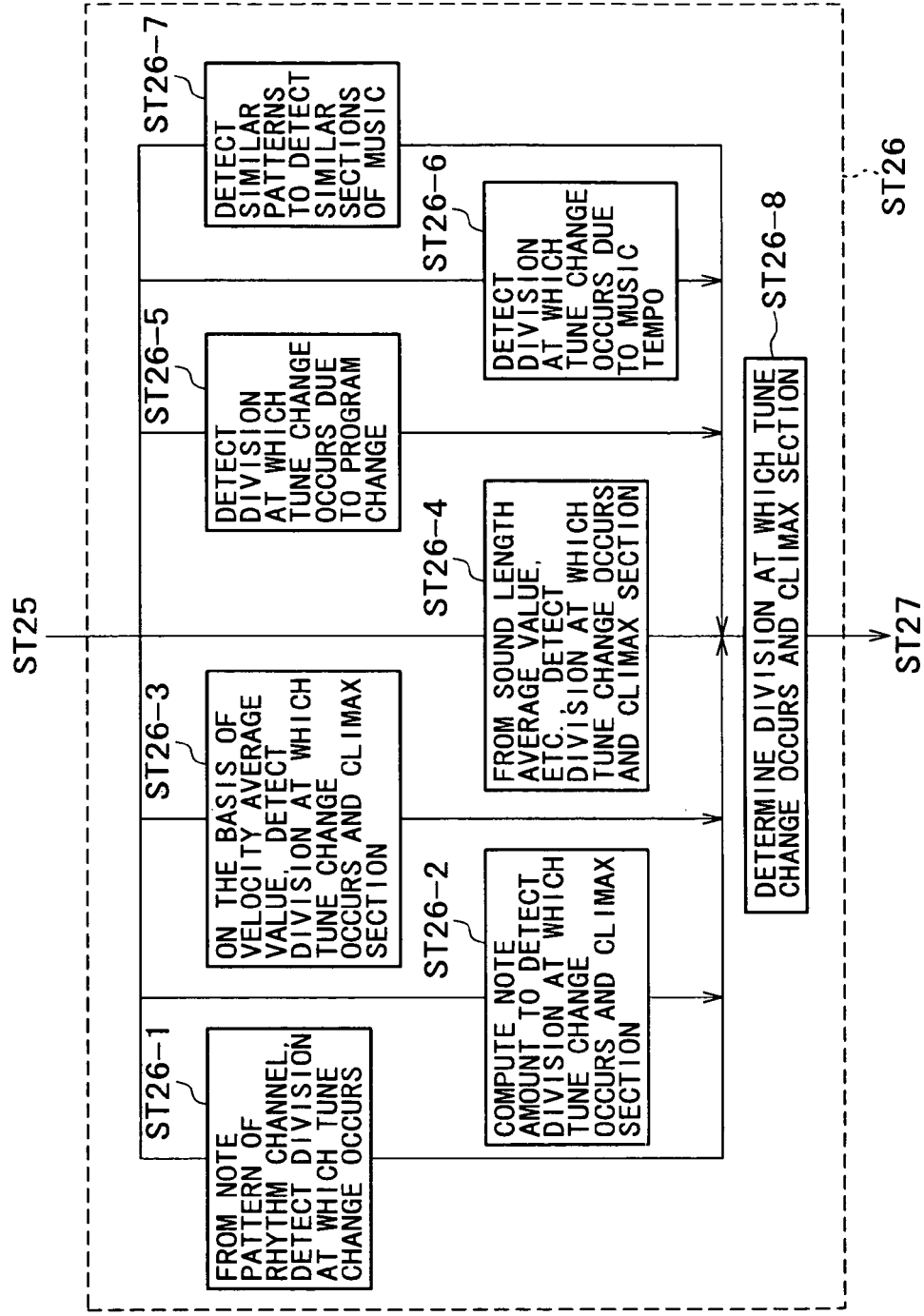

MENU
Mail ▶
Internet ▶
Bookmark ▶
Setting ▶
Dancing Character ▶

Dancing Character

SELECT MUSIC ▶
SELECT CHARACTER ▶
SELECT BACKGROUND ▶

INFORMATION-PROCESSING APPARATUS, IMAGE DISPLAY CONTROL METHOD AND IMAGE DISPLAY CONTROL PROGRAM

BACKGROUND OF THE INVENTION

The present invention relates generally to an information processing apparatus, an image display control method, and an image display control program. More particularly, the present invention is intended to control the motions of an image to be displayed in accordance with the reproduction of music information by detecting from music information a point at which a tune change takes place and/or a climax section of music, selecting image motion information on the basis of the result of the detection, and using the selected image motion information in accordance with the reproduction of the music information.

As information processing apparatuses diminish in size and weight and are enhanced in performance, portable information processing apparatuses have come to a wide use, for which various services are provided. One of these services is the music information distribution in which music information is distributed to mobile phones and the like which are portable information processing apparatuses, for example. Use of this service allows the setting of the ringing tone of each mobile phone to a desired music tone based on the downloaded music information. Also, in the music information distribution, the distribution of play data files based on the MIDI (Musical Instruments Digital Interface) standard much smaller in data amount as compared with normal music data (or streaming data) is practiced, these files including files such as based on SMF (Standard MIDI File) proposed by US Opcode Systems, Inc., SMAF (Synthetic music Mobile Application Format) proposed by Yamaha Corporation, General MIDI Lite proposed by Association of Musical Electronics Industry, and Compact MIDI for example.

Further, in the reproduction of the above-mentioned play data, a character display operation is executed. For example, patent document 1 shown below discloses that a character is assigned with a rhythm component which it is good at and is related to its unique posture expressing capability in advance, a frequency band clocking a rhythm is identified from the music data, the rhythm component is estimated from the variation in sound pressure data, and the posture expression capability is cumulatively varies in accordance with the estimated rhythm component, thereby varying the displayed posture of the character. Patent document 2 shown below discloses that a volume level and a frequency level are computed by analyzing the waveform data of sound data and the motion information for use in dance animation such as choreographic data and formations on the basis of the computed volume and frequency levels is varied, thereby executing animation displays having different motions for different signals to be reproduced. Further, patent document 3 shown below discloses that the speed of animated actions is controlled in accordance with BPM indicative of the tempo of music, thereby executing image display with rhythmic sense without preparing the animation having a action speed matched with each piece of music.

[Patent document 1]
Japanese Patent Application No. 3066528
[Patent document 2]
Japanese Patent Laid-open No. 2001-118084
[Patent document 3]
Japanese Patent Laid-open No. 2001-269483

However, problems with the above-mentioned related art technologies lie in that, when music is reproduced on the basis of music information, controlling the motions of a character simply on the basis of the rhythm component, volume and frequency levels, and BPM indicative of tempo may make the motion variations monotonous, thereby making it impossible to execute the display operations which are excellent in entertainment and visual effects in accordance with music information.

To be more specific, musical compositions have each a plurality of tune change points and is formed by, for example, "introduction" indicative of the beginning of music, "verse" indicative of the beginning of the entire melody, "chorus" indicative of climax section of music, "bridge" which links "verse" with "chorus", and "ending" which indicates the end section of music. For this reason, the levels of entertainment and visual effects cannot be enhanced unless not only a character moves in accordance with particular musical compositions but also character motions correspond to the forms of particular musical compositions.

SUMMARY OF THE INVENTION

It is therefore an object of the present invention to provide an information processing apparatus, an image display control method, and an image display control program that are intended to display images with high levels of entertainment and visual effects in accordance with music information on the basis thereof.

In carrying out the invention and according to one aspect thereof, there is provided an information processing apparatus including: information accumulating means for accumulating image motion information; display means for displaying images; and control means for detecting, from music information, a division at which tune change occurs and/or a climax section of music, selecting the image motion information on the basis of a result of the detection, and displaying on the display means a moving image in accordance with the reproduction of the music information by use of the selected image motion information in accordance with the reproduction of the music information.

In carrying out the invention and according to another aspect thereof, there is provided an image display control method including the steps of: detecting, from music information, a division at which tune change occurs and/or a climax section of music, selecting the image motion information on the basis of a result of the detection, and displaying on the display means a moving image in accordance with the reproduction of the music information by use of the selected image motion information in accordance with the reproduction of the music information.

In carrying out the invention and according to still another aspect thereof, there is provided an image display control program for having a computer execute the procedures of: detecting, from music information, a division at which tune change occurs and/or a climax section of music; selecting image motion information on the basis of a result of the detection; displaying a moving image in accordance with the reproduction of the music information by use of the selected image motion information in accordance with the reproduction of the music information.

In the present invention, meters are detected from play data based on the MIDI standard for example which is music information to divide a piece of music on a measure basis. By use of note information of a MIDI event of each measure and/or information about a meta event, a division at which tune change occurs and/or climax section of music is detected. Further, on the basis of the result of this detection, image motion information is selected, which is used in accordance with the reproduction of music information, thereby displaying a moving image matched with the reproduction of music information.

BRIEF DESCRIPTION OF THE DRAWINGS

These and other objects of the invention will be seen by reference to the description, taken in connection with the accompanying drawing, in which:

FIG. 1 is a block diagram illustrating an exemplary configuration of an information processing apparatus practiced as one embodiment of the invention;

FIG. 7 is a flowchart indicative of the detection of a division at which tune change occurs and a climax section of music;

DETAILED DESCRIPTION OF PREFERRED EMBODIMENTS

Figure 2:
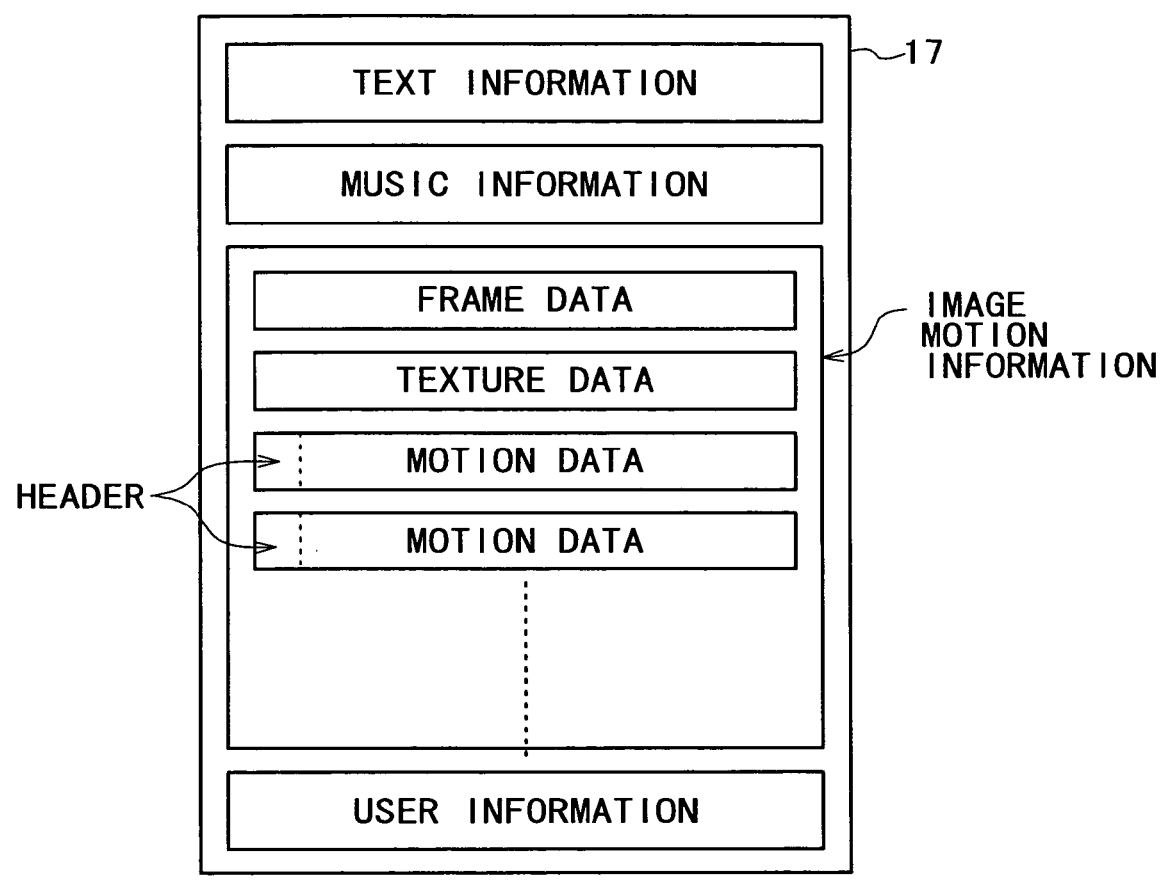
FIG. 2 is a diagram illustrating accumulated information in an information accumulation block.

This invention will be described in further detail by way of example with reference to the accompanying drawings. Referring to FIG. 1, there is shown a block diagram illustrating an exemplary configuration of an information processing apparatus, a mobile phone for example.

A receive signal Sa received at an antenna 11 is supplied to an RF transceiver block 12. The RF transceiver block 12 executes the down-conversion processing by use of a signal having a local oscillation frequency, the removal of image signal component by use of a filter, and the signal selection for selecting a signal having a desired channel frequency, thereby generating an intermediate frequency signal of a desired channel from the receive signal Sa. In addition, the RF transceiver block 12 executes demodulation processing on the generated intermediate frequency signal to generate a baseband demodulated signal Sb, supplying the generated baseband demodulate signal to a baseband signal processing block 13. Further, the RF transceiver block 12 executes modulation processing on a send information signal Ta supplied from the baseband signal processing block 13 to generate a modulated signal. Still further, the RF transceiver block 12 executes the up-conversion processing on the modulated signal by use of the local oscillation frequency signal to generate a send signal Tb, which is supplied to the antenna 11 for the transmission of the send information signal Ta.

If the demodulated signal Sb is a signal indicative of audio information, the baseband signal processing block 13 generates an audio signal SAout on the basis of this demodulated signal Sb and supplies the generated signal to a speaker 14. If the demodulated signal Sb is text information, image information, or music information for example, then the baseband signal processing block 13 supplies information signal Da generated on the basis of the demodulated signal Sb to an information accumulation block 17 or a control block 20 via a bus 30. Further, the baseband signal processing block 13 generates send information signal Ta on the basis of a microphone signal SAmic supplied from a microphone 15 or an information signal Db supplied from the control block 20 and supplies the generated send information signal to the RF transceiver block 12. Still further, when music data DS such as music are supplied from the control block 20, the baseband signal processing block 13 generates the audio signal SAout on the basis of the music data DS and supplies the generated signal to the speaker 14.

The information accumulation block 17, constituted by use of a nonvolatile memory, stores the information signal Da supplied from the baseband signal processing block 13, consequently accumulating text information, music information, image motion information for displaying moving pictures, and user information (for example, telephone number information) as shown in FIG. 2.

Figure 3:
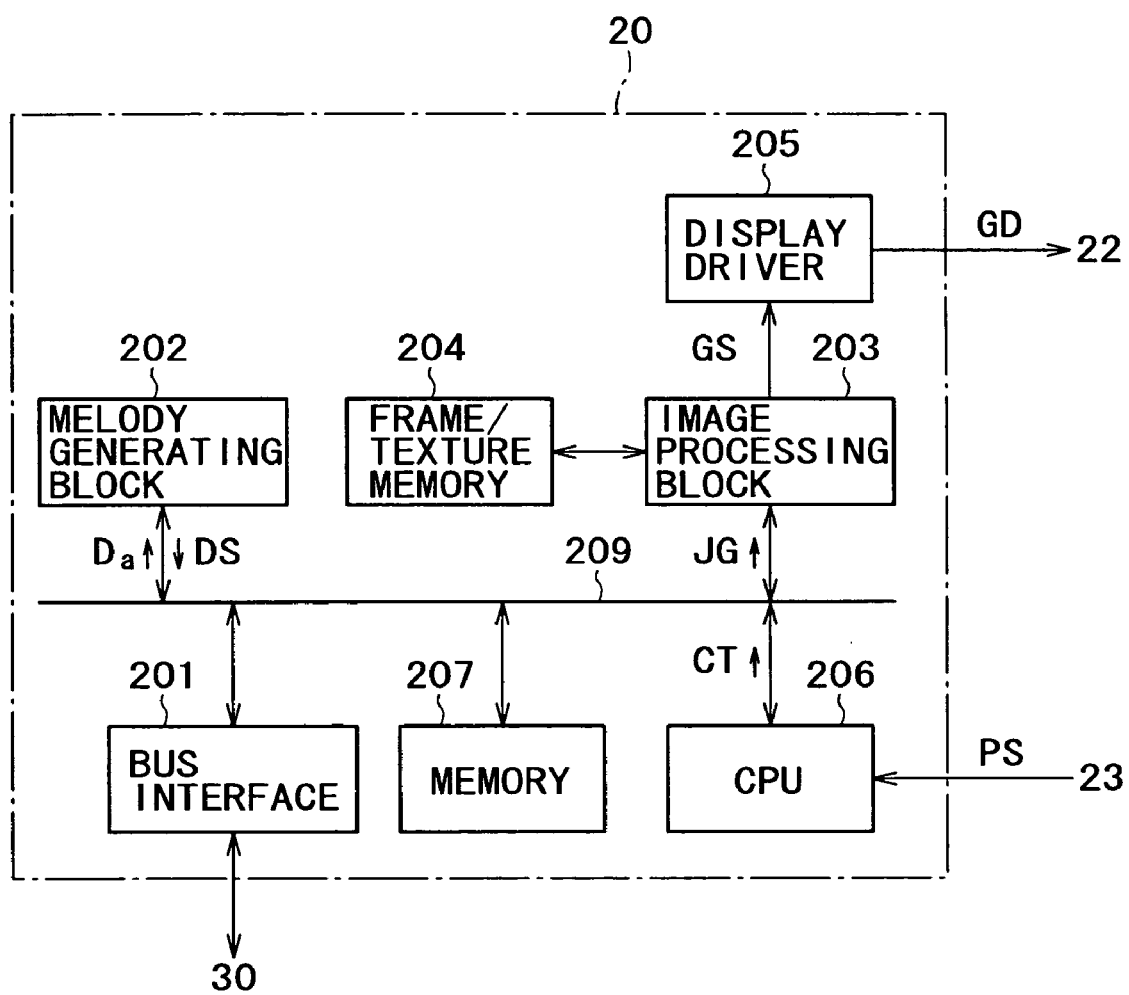
FIG. 3 is a block diagram illustrating an exemplary configuration of a control block of the information processing apparatus shown in FIG. 1.

The control block 20 executes control operations for executing various applications. FIG. 3 shows the configuration of the control block 20. A bus interface 201 of the control block 20 interfaces the bus 30 with a bus 209 in the control block 20. The bus 209 is connected to a melody generating block 202, an image processing block 203, a CPU (Central Processing Unit) 206, and a memory 207.

The memory generating block 202 generates music data DS on the basis of the music information accumulated in the information accumulation block 17 or the information signal Da indicative of music information supplied from the baseband signal processing block 13 and supplies the generated music data DS to the baseband signal processing block 13. Thus, by supplying the music data DS to the baseband signal processing block 13, desired melodies may be outputted from the speaker 14. Besides, controlling through the CPU 206 such that the music data DS of a desired piece of music are supplied to baseband signal processing block 13 at the time of call termination allows the setting of the ringing to a desired melody. Further, reading the desired music information from the music information accumulated in the information accumulation block 17 and supplying the retrieved music information to the memory generating block 202 allow the realization of a karaoke function for example.

A frame/texture memory 204 is connected to the image processing block 203. An image signal GS is generated by use of the frame/texture memory 204 and the image motion information JG read from the information accumulation block 17 by the CPU 206. Alternatively, an image signal GS is generated on the basis of the information signal Da supplied from the baseband signal processing block 13. The GS signal thus generated is supplied to a display driver 205.

For example, the information accumulation block 17 accumulates the image information for forming images such as the information (frame data) indicative of a frame of an image and the information (texture data) about a texture to be attached to the frame for example and the motion information such for moving images such as the motion information (motion data) for moving the frame, as the image motion information for displaying moving pictures as shown in FIG. 2. Thus, when frame data, texture data, and motion data are accumulated, the amount of accumulated data may be decreased as compared with the accumulation of the image signals of a moving picture for each motion. At the same time, image signals for various motions may be generated with less data. In addition, frame data, texture data, and motion data may be prepared for each character or frame data and motion data may be shared between different characters, thereby displaying various characters. It should be noted that if the capacity of the information accumulation block 17 is large enough, the image signals for each motion may be accumulated as image motion information.

The image processing block 203 stores the frame data read from the information accumulation block 17 by the CPU 206 into the frame/texture memory 204 and then writes the data of the read texture to a corresponding frame data position, thereby generating an image signal GS. The image processing block 203 moves the frame in accordance with the read motion data and executes morphing on the frame by use of Bezier curves for example, thereby generating an image signal GS which continuously represents an image motion. Thus, executing the morphing by use of a Bezier curve may easily generate a image signal continuously representing an image move on the basis of a simple configuration. The image signal GS thus generated is supplied to the display driver 205.

Further, the image processing block 203 generates an image signal GS on the basis of the text information accumulated in the information accumulation block 17 and supplies the generated image signal to the display driver 205.

A display block 22 is connected to the display driver 205. The display driver 205 generates a display drive signal GD corresponding to the display block 22 on the basis of the image signal GS supplied from the image processing block 203. When the generated display drive signal GD is supplied to the display block 22, a moving picture and text information for example are displayed on the display block 22.

The CPU 206 executes a program stored in the memory 207 to generate a control signal CT on the basis of an operation signal PS supplied from a user interface 23 connected to the CPU 206. In addition, the CPU 206 supplies this control signal CT to the information processing apparatus and the control block 20 to execute control such that the operation of the information processing apparatus becomes a desired operation. For example, when an operation for reproducing music information stored in the information accumulation block 17 is done, the CPU 206 reads the music information of the music to be reproduced and supplies the music information to the memory generating block 202. At this moment, the music data DS generated on the basis of the music information are supplied to the baseband signal processing block 13 and the melody based on the selected music information is outputted from the speaker 14. When an operation for displaying text information accumulated in the information accumulation block 17 is done, the CPU 206 reads the text information to be displayed and supplies it to the image processing block 203. The image processing block 203 generates an image signal GS on the basis of the text information as described above and supplies the generated image signal to the display driver 205, on which the selected text information is displayed.

Also, the CPU 206 detects, from the music information accumulated in the information accumulation block 17, a division at which tune change occurs and a climax section and selects image motion information on the basis of the detection. Then, when this music information is reproduced, the CPU 206 reads, from the information accumulation block 17, the selected image motion information in accordance with the reproduction of the music information and supplies the image motion information to the image processing block 203, thereby displaying, on the display block 22, a moving picture in accordance with the reproduction of the music information. For example, a character that dances to the music is displayed.

The display block 22 shown in FIG. 1 is constituted by a liquid crystal device for example, displaying text information such as mail for example, and at the time of reproducing music information, an image for example such as a character which moves in accordance with music. The user interface 23 is constituted by keys, a jog dial, or a touch-sensitive panel for example, supplying an operation signal PS caused by user operation to the CPU 206 of the control block 20. An external interface 24 for providing the connection with external equipment is connected to the bus 30. Through this external interface 24, information is exchanged with external devices in a wired or wireless manner. It should be noted that the information processing apparatus also has a memory (not shown) for example, in which various kinds of data is stored on a temporary basis.

Figure 4:
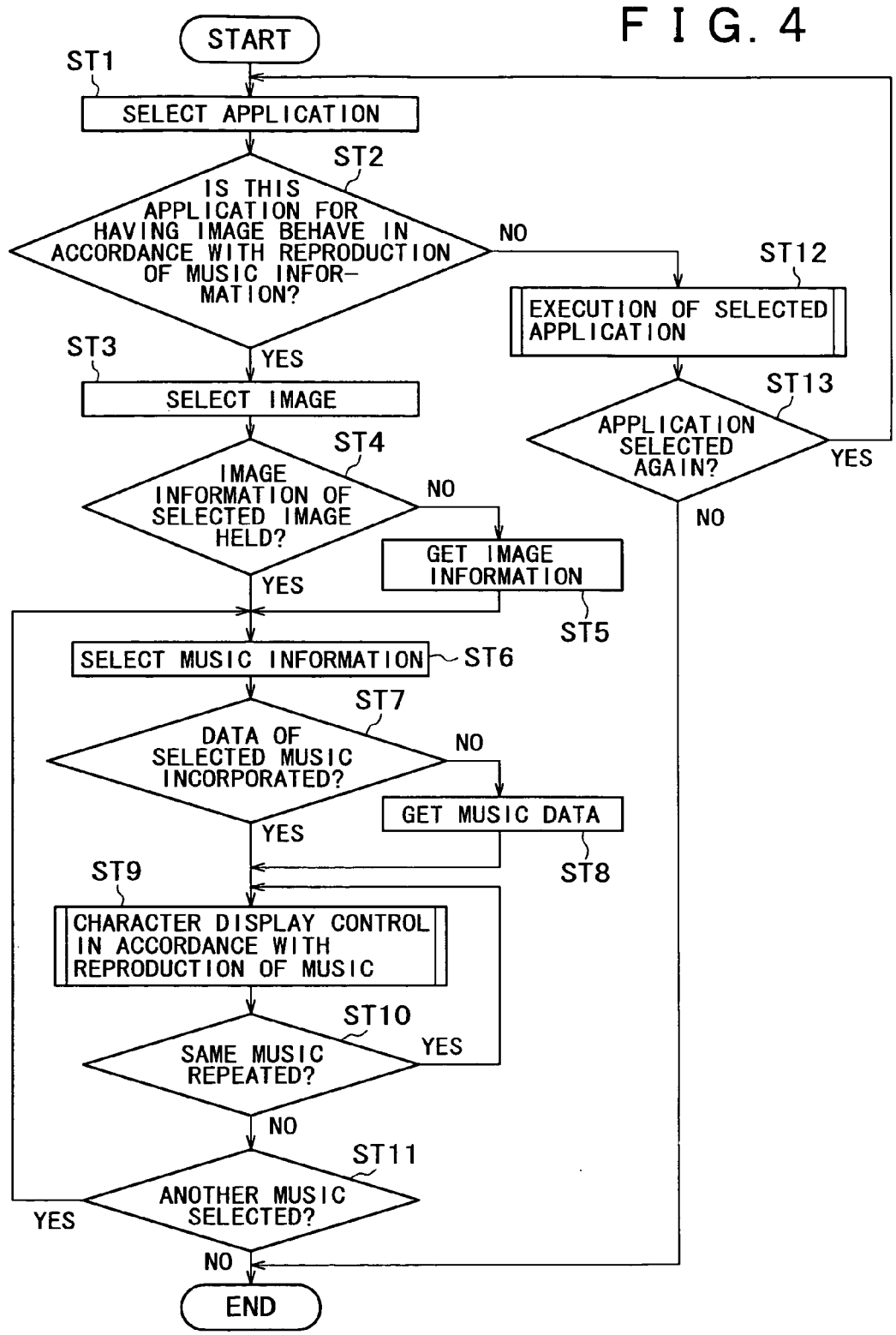
FIG. 4 is a flowchart indicative of operations of the information processing apparatus shown in FIG. 1.

FIG. 4 is a flowchart indicative of one form of the operations of the information processing apparatus. In step ST1, an application is selected. In step ST2, a decision is made whether or not the selected application is one that moves an image in accordance with the reproduction of music information. If the application for moving an image in accordance with the reproduction of music information is selected, the procedure goes to step ST3. If the application for moving an image in accordance with the reproduction of music information is not selected, the procedure goes to step ST12.

In step ST3, an image to be displayed is selected. In step ST4, a decision is made whether or not the image information of the selected image is accumulated in the information accumulation block 17. If the image information of the selected image is accumulated, the procedure goes to step ST6. If this information is not accumulated, the procedure goes to step ST5, in which the image information of the selected image is obtained, upon which the procedure goes to step ST6. In this acquisition of the image information, the image information is downloaded from an information distribution server having the image information via the RF transceiver block 12 for example. Alternatively, the image information is downloaded from an external device such as a computer for example via the external interface 24.

In step ST6, the music information to be reproduced is selected. In step ST7, a decision is made whether or not the selected music information is accumulated in the information accumulation block 17. If the selected music information is accumulated, the procedure goes to step ST9. If the selected music information is not accumulated, the procedure goes to step ST8, in which the selected music information is obtained in the same manner as the image information, upon which the procedure goes to step ST9.

In step ST9, image display control matched with the reproduction of the music information is executed, upon which the procedure goes to step ST10. In step ST10, a decision is made whether or not an operation for repeating the reproduction of the same music information has been done. If the operation for repeating the reproduction of the same music information has been done, the procedure returns to step ST9. If this operation has not been done, the procedure goes to step ST11.

In step ST11, a decision is made whether or not an operation for reproducing another piece of music information has been done. If an operation for reproducing another piece of music information has been done, the procedure returns to step ST6. If an operation for reproducing another piece of music information has not been done, the processing comes to an end.

When the procedure goes from step ST2 to ST12, the application selected in step ST11 is executed in step ST12. Then, when the selection application is ended, the procedure goes to step ST13, in which a decision is made whether or not an operation for selecting an application again has been done. If an operation for selecting an application again has been done, the procedure returns to step ST1 to select an application to be executed next. If an operation for selecting an application again has not been done, the processing comes to an end.

Figure 5:
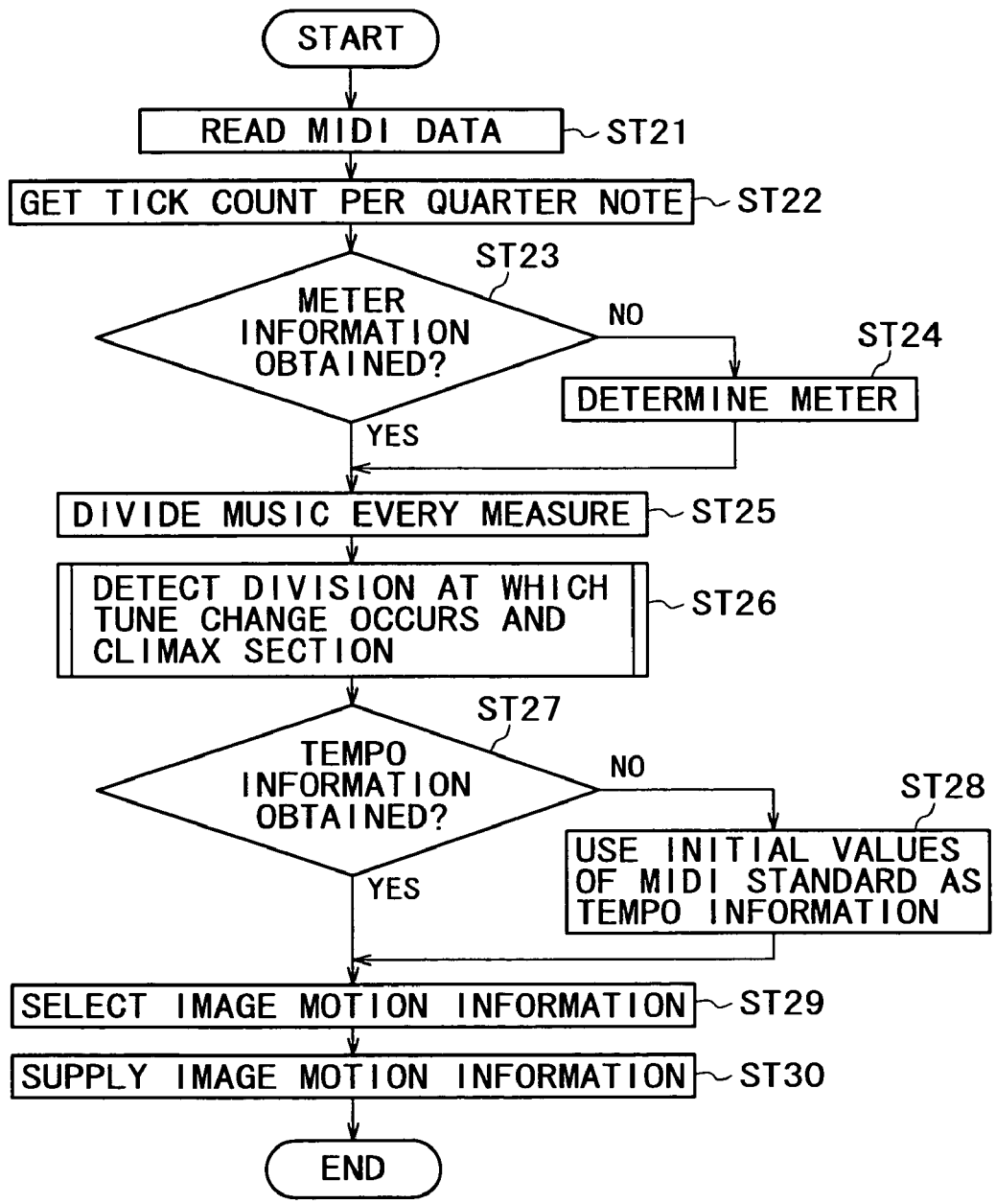
FIG. 5 is a flowchart indicative of an image display control operation.

FIG. 5 is a flowchart indicative of an image display control operation matched with the reproduction of music information. In step ST21, music information, an SMF for example, is read, upon which the procedure goes to step ST22.

Figure 6A:
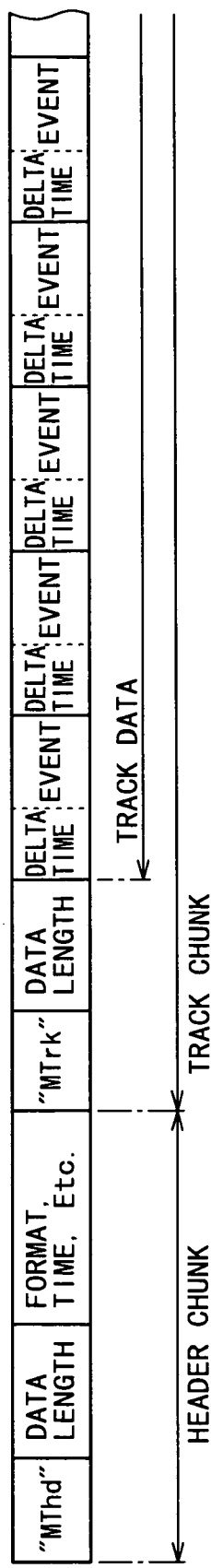
FIG. 6A is a diagram illustrating a data structure of a MIDI file.

The MIDI file data structure in this SMF has a header chunk containing header information and a track chunk containing MIDI and meta events to be described later, as shown in FIG. 6A.

The header chunk is configured by text data "MThd" indicative of the start of the header chunk, followed by data length, format type, track count, and time unit, in this order. The time unit is the number of Ticks per quarter note, for example.

The track chunk is configured by text data "MTrk" indicative of the start of the track chunk, followed by data length and a track data section containing time information and MIDI event, and time information and meta event, in this order. The MIDI event is configured by play data for generating music signals for instrument timbres. The meta event includes, in the SMF, such information not contained in the MIDI event play data as the music information about the entire music like the information about the velocity of music (the number of beats to be played in one minute, and so on) and the information about the meter of music (duple meter, triple meter, or quadruple meter for example) and the information to be used by a sequence software program (or a sequencer) like music information, lyrics, and copyright credit for example.

The time information in the data section is called a delta time, which is expressed in a variable-length number for representing a number with a required minimum byte sequence. This time information called a delta time is indicative of a time that has passed from the last event. By integrating this delta time, the length of a play may be determined.

Figure 6B:
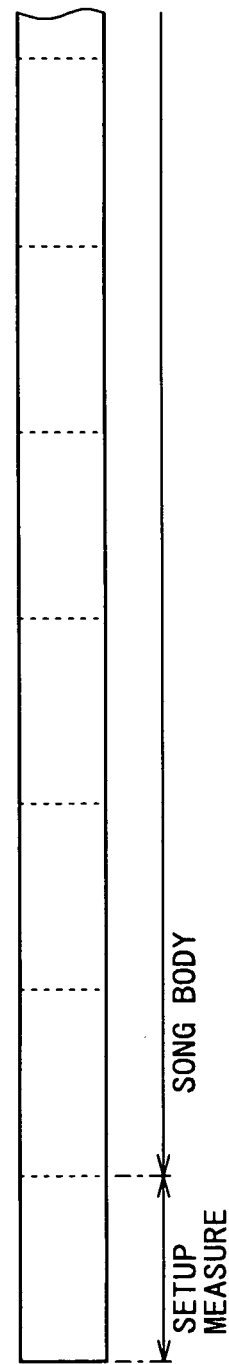
FIG. 6B is a diagram illustrating a data structure of the MIDI file shown in FIG. 6A.

In the data section, a setup measure is arranged before the song body indicative of the play data of music as shown in FIG. 6B. In the setup measure, meter, tempo, timbre, and loudness are set by use of the above-mentioned meta event. The song body is configured by note information and tempo setting information. Note information is configured by 3-byte note-on, MIDI information for sounding a tone and 3-byte note-off, MIDI information for stopping a tone. Byte 1 of note-on indicates channel number, byte 2 indicates note number (or interval), and byte 3 indicates note-on velocity (or a speed at which a key is pressed). Byte 1 of note-off indicates channel number, byte 2 indicates note number (or interval), and byte 3 indicates note-off velocity (or a speed at which a key is released).

In step ST22 shown in FIG. 5, header chunk information is read to get the number of Ticks per quarter note.

In step ST23, a decision is made whether or not meter information has been obtained. If meter information has not been obtained from the setup measure, the procedure goes to step ST24. If meter information has been obtained, the procedure goes to step ST25.

In step ST24, meter determination is executed. In this meter determination, the meter of music is determined by use of note information, upon which the procedure goes to step ST25. For example, a note-on timing is detected for the rhythm channel in which meter determination is easy. At the same time, from the number of Ticks per quarter note, timings such as duple meter, triple meter, and quadruple meter are generated. The timing of note-on detected from the rhythm channel is compared with the detected note-on timing of each meter to set the meter having the most similar timing as the meter of the music. In another method, from the number of Ticks per quarter note, the duration of 1 beat is determined to divide the rhythm channel with which meter determination is easy by a measure of duple, triple, or quadruple time. Then, the durations of note-on and note-off in a measure are compared with those of other measures to set the meter in which the correlation is the highest as the meter of the music.

In step ST25, music is divided for each measure. In step ST26, a division at which tune change occurs and a climax section are detected. One piece of music is configured by a combination of "introduction" indicative of the beginning of music, "verse" indicative of the beginning of the entire melody, "chorus" indicative of the climax section, "bridge" indicative of the link between "verse" and "chorus", and "ending" indicative of the ending of one piece of music, for example. Hence, the boundaries between "introduction", "verse", "bridge", "chorus", and "ending" are detected by detecting the division at which tune change occurs. By detecting the climax section, "chorus" section for example is detected.

In the detection processing in step ST26, one or more detection processing operations are executed. On the basis of the obtained detection results, the division at which tune change occurs and the climax section are detected. For example, the detection processing shown in FIG. 7 is executed to detect the division at which tune change occurs and the climax section.

In the detection processing shown in step ST26-1, the division at which tune change occurs is detected on the basis of a note pattern of the rhythm channel. Namely, the patterns of note-on and note-off are determined for each measure to compare the determined note patterns of the measures. On the basis of a comparison result, the division at which tune change occurs is detected.

In the detection processing of step ST26-2, a note amount is computed to detect a division at which tune change occurs and a climax section. To be more specific, the number of note-on events for all channels for example is computed for each channel and the obtained number of events is used as a note amount. The division of a measure in which there is a large variation in differential value appears is regarded as the division at which tune change occurs. A section in which two or more measures in which the note amount is almost maximized continue is regarded as the climax section.

In the detection processing of step ST26-3, a velocity average value is computed to detect a division at which tune change occurs and a climax section. To be more specific, the averages of note-on velocity and note-off velocity are computed for each measure. The division of measures at which a large deviation appears in the differential value of the averages is regarded as the division at which tune change occurs. A measure in which the average is almost maximized, for example, a section in which two or more measures that are significant as music continue is regarded as a climax section.

In the detection processing of step ST26-4, an average of sound lengths or an average of deviation widths (the difference between the maximum and minimum values of sound lengths) to detect the division at which tune change occurs. To be more specific, the duration from note-on to note-off is obtained as a sound length for each channel to compute, from the obtained sound length, the average value of sound lengths and the variation widths thereof for each measure. The division of measures at which a large variation in the average value or the differential value of variation widths is regarded as the division at which tune change occurs.

In the detection processing of step ST26-5, the division at which tune change occurred due to program change is detected. Namely, when a timbre switching occurred due to a program change event, the division of measure at which this timbre switching occurred is regarded as the division at which tune change occurs.

In the detection processing of step ST26-6, the division at which tune change occurred due to music tempo is detected. Namely, when a music tempo change occurred due to a set tempo event, the division of measures at which this tempo change occurred is regarded as the division at which tune change occurs.

In the detection processing of step ST26-7, similar patterns are detected to detect the similar section of music. For example, the note patterns of measures are compared with each other and the section in which there is a similarity is regarded as the similar section of music.

In step ST26-8, the division at which tune change occurs and the climax section are determined on the basis of one or more detection results obtained in steps ST26-1 through ST26-7.

Figure 8:
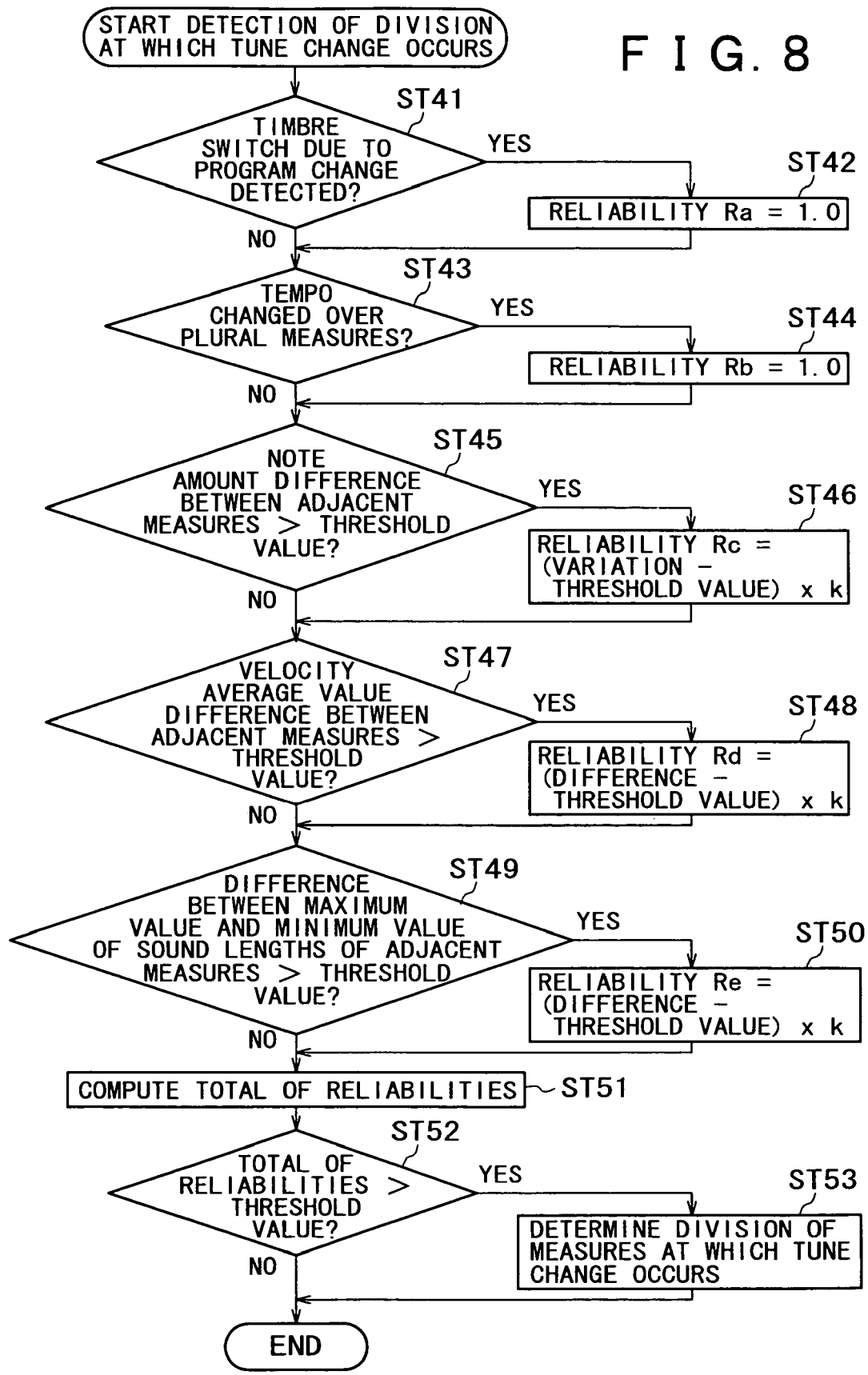
FIG. 8 is a flowchart indicative of one form the detection of a division at which tune change occurs.

The following describes the detection of a division at which tune change occurs. FIG. 8 is a flowchart indicative of one form in which a plurality of detection processing operations are executed to detect, in an overall manner, a division at which tune change occurs, by use of the result of each detection processing operation. The processing shown in FIG. 8 is executed on the division of each measure to determine whether or not the detected division is the division at which tune change occurs.

In step ST41, the above-mentioned detection processing of step ST26-5 is executed to determine whether or not the timbre switching due to a program change event has been detected. If the timbre switching has not been detected, the procedure goes to step ST43. If the timbre switching has been detected, reliability Ra is set to "1.0" in step ST42 and then the procedure goes to step ST43.

In step ST43, above-mentioned detection processing of step ST26-6 is executed to determine whether or not tempo has changed at a position two or more musically significant measures, four measures for example, away from the position at which tempo is changed last. If tempo is not changed in this manner, the procedure goes to step ST45. If tempo is changed in this manner, reliability Rb is set to "1.0" at step ST44 and the procedure goes to step ST45.

In step ST45, the above-mentioned detection processing of step ST26-2 is executed to determine whether or not difference EA between the note amount indicative of the number of note-on events in a measure and the note amount in the immediately preceding measure is greater than threshold value La. If difference EA is not greater than threshold value La, the procedure goes to step ST47. If difference EA is not greater than threshold value La, the procedure goes to step ST47. If difference EA is greater than threshold value La, reliability Rc is computed from equation (1) below in step ST46 and then the procedure goes to step ST47. It should be noted that "ka" in equation (1) denotes a coefficient which is determined on the basis of the maximum value and so on obtained by subtracting threshold value La from other reliabilities and difference EA between note amounts.

$$Rc=(EA-La) \times ka \qquad (1)$$

In step ST47, the above-mentioned detection processing of step ST26-3 is executed to compute the average value of note-on velocities and note-off velocities in a measure. If difference EB between this average value and the average value in the immediately preceding measure is not greater than threshold value Lb, the procedure goes to step ST49. If difference EB of note amount is greater than threshold value Lb, reliability Rd is computed from equation (2) below in step ST48 and then the procedure goes to step ST49. It should be noted that "kb" in equation (2) is determined on the basis of the maximum value and so on obtained by subtracting threshold value Lb from other reliabilities and difference EB between average values, as with coefficient "ka".

$$Rd=(EB-Lb) \times kb \qquad (2)$$

In step ST49, the above-mentioned detection processing of step ST26-4 is executed to obtain the duration from note-on to note-off within a measure for each channel as a sound length, thereby computing the variation width of the obtained sound length for example. If difference EC between this variation width and the variation width in the immediately preceding measure is not greater than threshold value Lc, the procedure goes to step ST51. If difference EC between the variation widths is greater than threshold value Lc, then reliability Re is computed from equation (3) below in step ST50 and then the procedure goes to step ST51. It should be noted that "kc" in equation (3) is determined on the basis of the maximum value and so on obtained by subtracting threshold value Lc from other reliabilities and difference EC between variable widths, as with coefficient "ka".

$$Re=(EC-Lc) \times kc \qquad (3)$$

The processing operations of steps ST51 through ST53 correspond to step ST26-8. In step ST51, total value TR of reliabilities Ra through Re is computed and then procedure goes to step S52. In step ST52, total value TR of reliabilities is compared with threshold value Lt. If total value TR is not greater than threshold value Lt, the processing on one measure is ended. If total value TR is greater than threshold value Lt, then the procedure goes to step ST53, in which the division between this measure and the measure immediately before is determined as the division at which tune change occurs, upon which the processing on one measure is ended.

By executing the above-mentioned processing on the start measure all the way to the end measure, the divisions at which tune change occurs may be sequentially detected from the top side of music.

Also, the processing operations of steps ST41 and ST42 are executed on all measures of music to determine reliability Ra for each measure. Then, the processing operations of steps ST43 and ST44 are executed on all measures of music to determine reliability Rb for each measure. Likewise, reliabilities Rc through Re are computed for all measures. In step ST51, the reliabilities may be totaled for all measures to detect the division at which tune change occurs.

Figure 9:
FIG. 9 is a diagram illustrating specific examples of divisions at which tune change occurs.

FIG. 9 shows specific examples of divisions at which tune change occurs. It should be noted that the following description is made with a quarter note being sound length "1". Measure ME1 starts with a chord of 3 quarter notes as shown in a treble staff, so that the note-on count is "3" and the sound length is "1". In the corresponding bass staff, measure ME1 starts with an eighth note following an eighth rest, so that the note-on count is "1" and the sound length is "0.5". When note-on counts and sound lengths are thus determined, the note-on count of measure ME1 is "14". In measure ME1, a dotted quarter note is the longest sound and a dotted sixteenth note is the shortest sound, so that the maximum value of sound length is "1.5", the minimum value is "0.25", and the variation width of sound length is "1.5–0.25". If the total of note-on velocities in measure ME1 is 1529 for example, the average value is "1529/14=109".

As with measure ME1, note-on counts, sound length variation widths, and velocity average values are computed in measures ME2 through ME5. Total value TR of reliabilities computed on the basis of these values is compared with threshold value Lt to determine that the division between measure ME3 and measure ME4 for example in which the variation in note-on count is conspicuous is the division at which tune change occurs.

Figure 10:
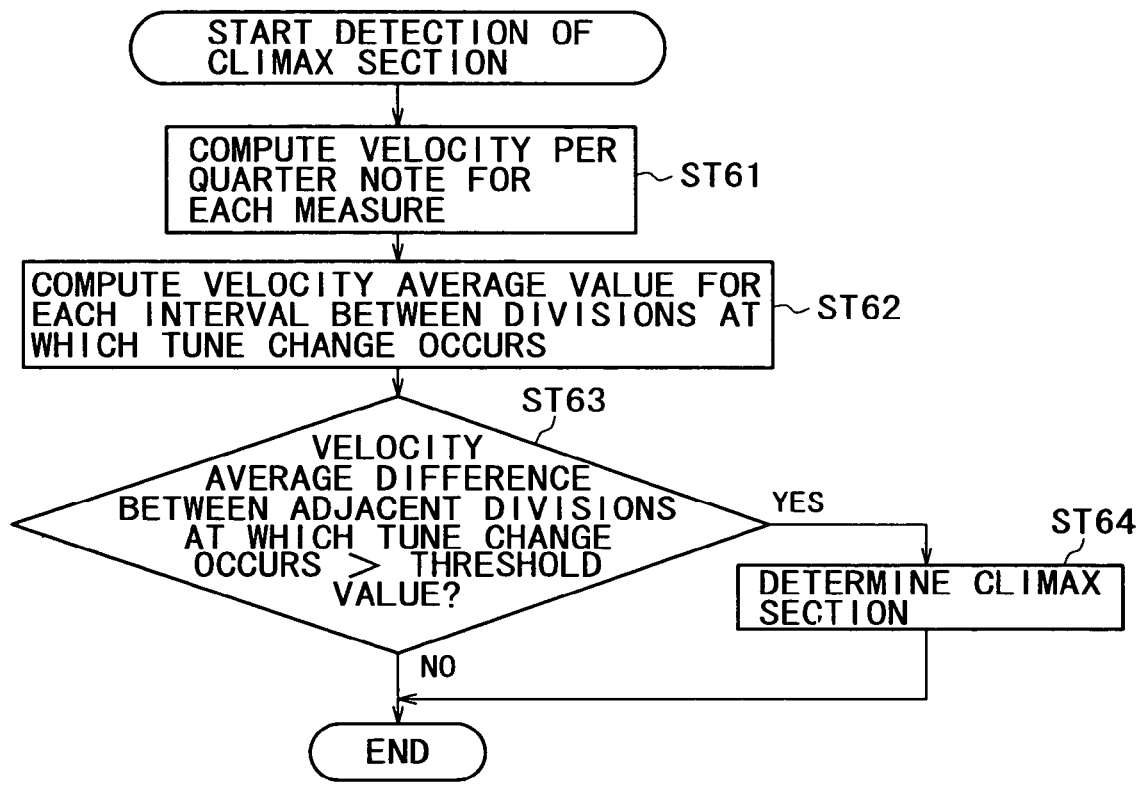
FIG. 10 is a flowchart indicative of one form of the detection of a climax section of music.

The following describes one form of the detection of a climax section of music. In the above-mentioned steps ST26-2 through ST26-4, a section in which two or more measures continue in which a climax status is musically significant is the climax section of that music, for example. Referring to FIG. 10, there is shown one form of detecting the climax section of music by use of the result of the detection of the division at which tune change occurs.

In step ST61, the velocity of each measure is computed. In this velocity computation, the velocity of each note is converted into a velocity which corresponds to the ratio of sound length of each note to quarter note for example and, by use of the converted velocity, a total of velocities in one measure is computed. For example, if the velocity of a half note is "100", the velocity is "100×2" because the sound length is twofold; if the velocity of a dotted eighth note is "93", the velocity is "193×0.75", because the sound length is 0.75 times as long; and if the velocity of a sixteenth note is "102", the velocity is "102×0.25" because the sound length is 0.25 times as long.

Alternatively, the total of velocities may be divided by note-on count to compute the velocity per note to use it as the velocity of the measure. In this case, the climax section of the music may be correctly detected even if the total of velocities gets large due to the arrangement, in a measure, of chords irrelevant to the climax section of the music, resulting in the enhanced reliability of detection results.

Thus, the velocity conversion is executed in accordance with the ratio of the sound length of each note to quarter note and a total of the velocities in one measure is computed by use of the converted velocity, upon which the procedure goes to step ST62. In step ST62, by use of the velocity computed for each measure, the velocity average value for each division at which tune change occurs is computed, upon which the procedure goes to step ST63.

In step ST63, a decision is made whether or not the difference between the velocity average values of adjacent sections at which tune change occurs is greater than the threshold value. If the difference between the velocity average value of one section and the velocity average value of the immediately preceding section, computed in step ST62, is not greater than the threshold value, the processing is ended. If the difference between the velocity average values is greater than the threshold value, the procedure goes to step ST64, in which the section in which the difference between the velocity average values is greater than the threshold value is determined as the climax section, upon which the processing is ended.

Thus, when the detection of a division at which tune change occurs and a climax section of music has been completed, the procedure goes from step ST26 to step ST27 shown in FIG. 5.

In step ST27, a decision is made whether or not tempo information has been obtained. If a tempo is set in the meta event, this tempo setting information is obtained, upon which the procedure goes to step ST29. If tempo information has not been obtained, the procedure goes to step ST28, in which the initial value (120) of the MIDI standard is used as tempo information, upon which the procedure goes to step ST29.

In step ST29, the image motion information accumulated in the information accumulation block 17 is selected. For example, as described above, if frame data, texture data, and motion data are used as image motion information, the motion data are attached, as additional information, with a header having music conditions indicative of compatible meter and tempo, intensity of motion, and texture conditions indicative of available texture data for example as shown in FIG. 2.

Here, the motion data satisfying the conditions by use of the additional information are discriminated on a measure basis. For example, the motion data are discriminated which satisfy the music conditions in which meters are equal and tempos are included within a range, the intensity in accordance with the climax of music, and the texture conditions of textures (the texture of a character to be displayed) selected by the operation signal PS supplied from the user interface 23. Next, motions corresponding to a division at which tune change occurs and a climax section of music are allocated from the discriminated motion data, or the motion data corresponding to the character to be displayed. In this motion allocation, motions are allocated such that there is no discontinuation between motions.

Figures 11A, 11B, 11C:
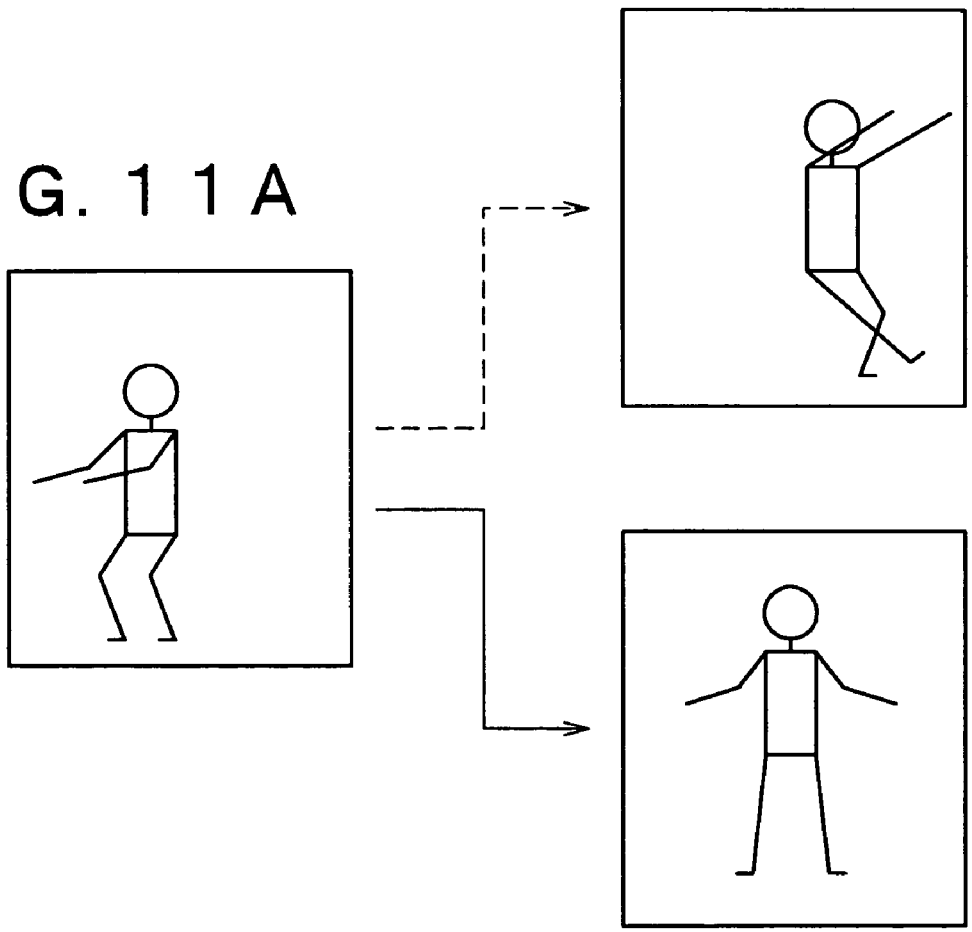
FIGS. 11A, 11B, and 11C are diagrams illustrating motion allocation.

The header of motion data is provided with the information about a motion start position and a motion end position. Motions are sequentially allocated such that there is no awkwardness in the link between the end position and the next start position. For example, if a motion ends at the position shown in FIG. 11A and the start position of the next motion is as shown in FIG. 11B, the motions of the body and the limbs are too large, so that the linkage parts move in an unnatural manner. Hence, the motion data in which the motion start position is as shown in FIG. 11C which is not large in the motion of body and limbs are allocated, thereby preventing the motions of linkage parts from becoming unnatural.

Unique information, motion ID for example, may be added to each piece of motion data. Use of this motion ID may facilitate the selection of the motion data that provide natural linkage motions. Namely, instead of the information about motion start position and end position, the motion ID of motion data providing natural linkage motions is used as linkable information. In addition, along with the added motion ID, the linkable information is including in the header. It is assumed here that, in the allocation of next motion data, the motion data of the motion ID indicated by the linkable information provided in the header be used. It is also assumed that, if there are two or more motion IDs as linkable information, any one of these motion IDs be selected and the motion data of the selected motion ID be used. Thus, use of the information unique to each piece of motion data facilitates the allocation of motion data that provide natural linkage motions.

Further, in the allocation of motion data, the motion data are allocated such that there is neither feeling odd in the beginning of a motion of the introduction nor feeling odd in the ending of a motion of the ending.

Moreover, motion data in units of plural measures such as 2, 3, or 4 measures are provided and a decision is made whether or not the music is repeated on a measure basis. For example, a decision is made by paying attention to the note-on count whether or not the count is repeated on a measure basis. If the count is repeated on a measure basis, the data corresponding to the number of repeated measures are selected from the motion data that is in units of plural measures. Further, from the selected motion data, one piece of motion data is determined by referencing the velocity variation for example in units of repeated measures. It should be noted that, if the repetition is not made on a measure basis, the motion data is selected from the motion data that is in units of one measure as shown above.

Still further, the divisions at which tune change occurs may be compared with each other to determine similar sections in each of which motion data are allocated in the same manner, thereby executing the well-matched display of motions. This allows the display of the equal motions in the first and second numbers of the music for example.

Thus, in step ST29, the image motion information is selected in accordance with the position at which the music is reproduced, upon which the procedure goes to step ST30.

In step ST30, the selected image motion information JG is supplied to the image processing block 203 in accordance with the reproduction of the MIDI data. At this moment, the image processing block 203 attaches a texture to the supplied motion data to form an image. In addition, when an image is moved by the motion data, the image processing block 203 generates an image signal GS indicative of a smoothly moving image by use of the morphing based on Bezier curves for example and supplies the generated image signal GS to the display driver 205.

Figure 12A:
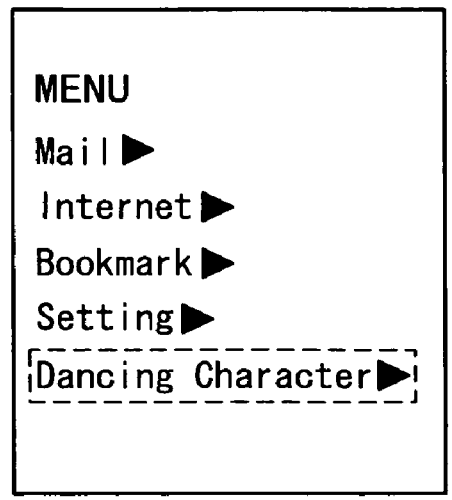
FIGS. 12A, 12B, and 12C are diagrams illustrating examples of display operations on the information processing apparatus shown in FIG. 1.
Figure 12B:
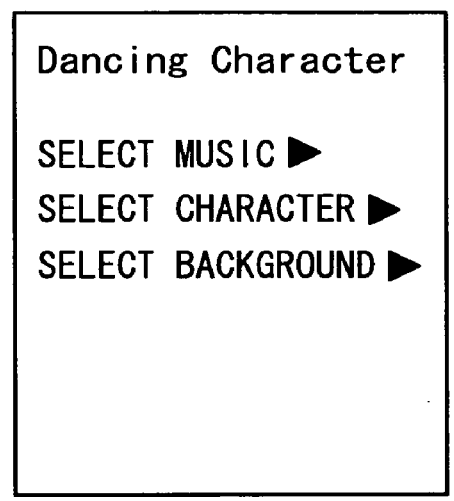
Figure 12C:
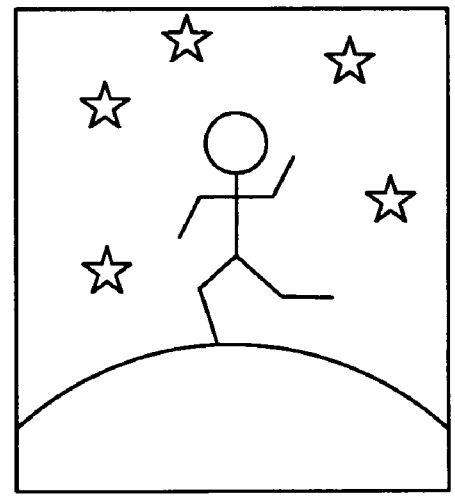

FIGS. 12A, 12B, and 12C show an example of operation display on the information processing apparatus. When the menu select key of the user interface 23 of the information processing apparatus is operated, the control block 20 displays a menu display shown in FIG. 12A for example on the display block 22. When menu item "Dancing Character" for displaying a character which dances to the music is selected, a select display shown in FIG. 12B is displayed on the display block 22. From this selected display, the user selects item "Select Music" or "Select Character" for example to make ready the selection of music or character. It should be noted that, in the selection of music and character, those stored in the information accumulation block 17 are selected. Also, in the selection of music and character, those for which music information and image motion information can be obtained via the RF transceiver block 12 or the external interface 24 may be selectable.

When music or character selection has been done, the control block 20 executes the above-mentioned processing shown in FIG. 5 and displays on the display block 22 the image which generates a motion in conformity with the reproduction of music as shown in FIG. 12C, namely the motion-picture display in which the selected character dances in conformity with the selected music.

Thus, according to the above-mentioned embodiment, a division at which tune change occurs and/or a climax section is detected from music information and, on the basis of the result of this detection, image motion information is selected, the selected image motion information being used in accordance with the reproduction of the music information. Hence, the image motion information is selected in accordance with the tune and the climax section to provide effects that as if the dances were designed automatically to the character to be displayed, thereby making it practicable to provide the image display which is excellent in entertainment and visual effects. Also, because motion switching is executed at the division between measures, the motion of the character becomes further in harmony with the music, thereby further enhancing entertainment and visual effects. Moreover, image motion information is selected on the basis of the MIDI data used to minimize the amount of data when music is downloaded, the image display that is excellent in entertainment and visual effects may be efficiently executed on the basis of music information.

Figure 13:
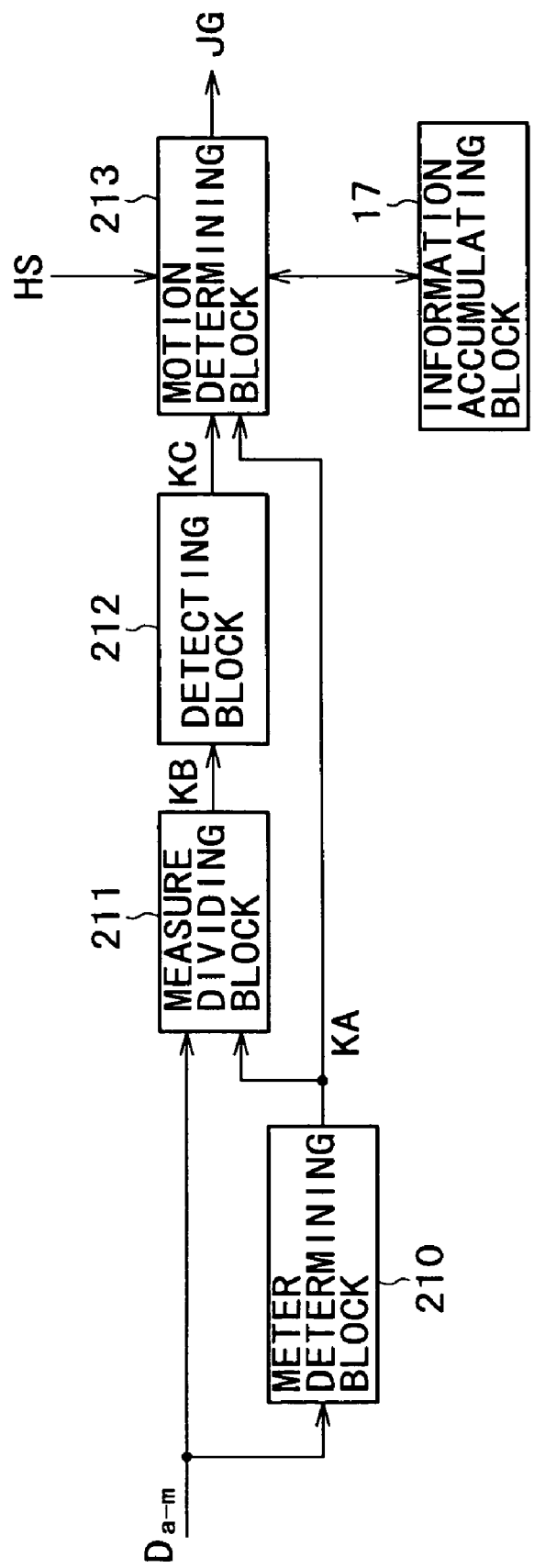
FIG. 13 is a block diagram illustrating an exemplary hardware configuration for realizing image display control.

Meanwhile, the image display control operation matched with the reproduction of music information shown in FIG. 5 may also be realized by a hardware configuration shown in FIG. 13. Referring to FIG. 13, a meter determining block 210 detects a meta event indicative of a meter from MIDI data Da-m. The meter determining block 210 also detects the number of Ticks per quarter note from the header chunk. If the meta event indicative a meter cannot be detected, the meter determining block 210 detects the a note-on timing by use of the data of a rhythm channel in which it is easy to discriminate meters for example. Further, the meter determining block 210 generates, from the obtained Tick count per quarter note, the timings of duple, triple, and quadruple meters, compares the note-on timing detected from the rhythm channel with the generated timing of each meter to determine the meter of the most similar timing as the meter of the music. After determining the meter of the music as described above, the meter determining block 210 generates a meter signal KA indicative of the meter of the music and supplies the generated meter signal to a measure dividing block 211 and a motion determining block 213.

The measure dividing block 211 divides, for each measure, the MIDI data Da-m by the meter indicated by the meter signal KA supplied from the meter determining block 210 and supplies the divided data to a detecting block 212 as measure data KB. The detecting block 212 computes note-on count, sound length and velocity average value from the measure data KB, detects a division at which tune change occurs and a climax section, and generates a detection result signal KC indicative of the result of the detection, supplying the detection result signal to a motion determining block motion determining block 213.

The motion determining block 213 selects image motion information accumulated in the information accumulation block 17 on the basis of the meter signal KA supplied from the meter determining block 210 and the detection result signal KC supplied from the detecting block 212. If a play start signal HS indicative of the starting of the reproduction of music is supplied, the motion determining block 213 supplies the selected image motion information JG to the image processing block 203 in accordance with the reproduction of music, thereby generating a image signal GS.

Thus, by supplying the selected image motion information JG to the image processing block 203 in accordance with the reproduction of music, images which are excellent in entertainment and visual effects may be displayed on the display block 22 as with the example shown in FIG. 5.

As described and according to the invention, a division at which tune change occurs and/or a climax section of music are detected from music information, image motion information is selected on the basis of the result of the detection, the selected image motion information is used for the reproduction of the music information, and a motion-picture display is executed in accordance with the reproduction of the music information. Consequently, an image display that is excellent in entertainment and visual effects causing motions matched with the reproduction of music information may be executed.

Further, meters are detected from music information to divide music on a measure basis and a division at which tune change occurs and/or climax section of music is detected by use of the music information on a measure basis. Consequently, by switching between motions at the division between measures, the switching may be executed in conformity with the music, so that the motions gets further in harmony with the music, thereby further enhancing entertainment and visual effects.

Still further, music information is the play data based on the MIDI standard and a division at which tune change occurs and/or a climax of music is detected by use of the note information of MIDI event and/or meta event information. Consequently, even if the data amount of the music information to be downloaded is relatively small, an image display that is excellent in entertainment and visual effects may be executed efficiently.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
information storage means for storing image motion information;
display means for displaying images; and
control means for detecting, from music information, a division at which tune change occurs based on a plurality of conditions and a climax section of music based on a velocity average difference between adjacent said detected divisions, selecting said image motion information on the basis of a result of the detection, and displaying on said display means a moving image in accordance with the reproduction of said music information by use of the selected image motion information in accordance with the reproduction of said music information.

2. The information processing apparatus according to claim 1, wherein said control means detects a meter from said music information, divides the music on a measure basis, and uses said music information for each measure, thereby detecting said division at which tune change occurs and said climax section of the music.

3. The information processing apparatus according to claim 2, wherein said music information is play data based on the MIDI standard and said control means detects said division at which tune change occurs and/or said climax section of said music by use of note information of a MIDI event and/or information of a meta event.

4. The information processing apparatus according to claim 3, wherein, if said music information does not contain meter information, said control means determines a meter on the basis of said note information of a MIDI event.

5. An image display control method comprising the steps of:
detecting, from music information, a division at which tune change occurs based on a plurality of conditions and a climax section of music based on a velocity average difference between adjacent said detected divisions, selecting said image motion information on the basis of a result of the detection, and displaying on said display means a moving image in accordance with the reproduction of said music information by use of the selected image motion information in accordance with the reproduction of said music information.

6. The image display control method according to claim 5, wherein a meter is detected from said music information, the music is divided on a measure basis, and said music information is used for each measure, thereby detecting said division at which tune change occurs and said climax section of the music.

7. The image display control method according to claim 6, wherein said music information is play data based on the MIDI standard and said division at which tune change occurs and/or said climax section of said music is detected by use of note information of a MIDI event and/or information of a meta event.

8. The image display control method according to claim 7, wherein, if said music information does not contain meter information, a meter is determined on the basis of said note information of a MIDI event.

9. An image display control program for having a computer execute the procedures of:
detecting, from music information, a division at which tune change occurs based on a plurality of conditions and a climax section of music based on a velocity average difference between adjacent said detected divisions;
selecting image motion information on the basis of a result of the detection;
displaying a moving image in accordance with the reproduction of said music information by use of the selected image motion information in accordance with the reproduction of said music information.

* * * * *